(12) United States Patent
Goss (10) Patent No.: US 6,570,077 B1
(45) Date of Patent: May 27, 2003

(54) TRAINING DEVICE FOR MUSICAL INSTRUMENTS

(76) Inventor: Stacy P. Goss, 15 Sycamore La., Albertville, AL (US) 35950

( * ) Notice: Subject to any disclaimer, the term of this patent is extended or adjusted under 35 U.S.C. 154(b) by 0 days.

(21) Appl. No.: 10/092,221

(22) Filed: Mar. 6, 2002

(51) Int. Cl.⁷ .............................................. G09B 15/06
(52) U.S. Cl. ................................... 84/477 R; 84/383 R
(58) Field of Search ............................. 84/465, 470 R, 84/477 R, 383 R, 380 R (56) References Cited

U.S. PATENT DOCUMENTS 2,383,553 A * 8/1945 Johnson ..................... 84/383 R
5,300,729 A * 4/1994 Tokunaga et al. ............. 84/619
5,403,966 A * 4/1995 Kawashima et al. .......... 84/612

* cited by examiner

*Primary Examiner*—Jeffrey Donels
(74) *Attorney, Agent, or Firm*—Bradley Arant Rose & White, LLP (57) ABSTRACT

Disclosed is a musical training device to determine when the air support applied to a musical instrument is sufficient to produce an acceptable musical tone, and to alert the musician when the air support required to produce an acceptable musical tone has been achieved. The device can be incorporated into a musical instrument without altering the manner and style in which the musical instrument is played, allowing the musician to correlate the feel of producing an air support sufficient to produce an acceptable musical tone, with the sound of the correct musical tone.

35 Claims, 4 Drawing Sheets

TRAINING DEVICE FOR MUSICAL INSTRUMENTS

FIELD OF THE DISCLOSURE

The present disclosure relates to a musical training device for measuring the air support applied to a musical instrument, so that the musical training device alerts the musician when the air support applied to the instrument is sufficient to produce an acceptable musical tone.

BACKGROUND

Wind musical instruments can be divided into two large classes, the woodwind instruments and the brass instruments. The woodwind instruments include those with reeds (saxophone, clarinet, oboe, and bassoon) and those with resonance openings (piccolo and flute). To produce sound the musician forms a pressure cavity with his mouth and blows air into or over (for piccolo and flute) the mouthpiece. The air travels through the reeded mouthpiece intermittently as the reed vibrates, or passes over the resonance opening in the flute and piccolo. Both actions cause the air mass in the mouthpiece to oscillate in pressure. This pressure oscillation then propagates into the musical instrument thereby producing sound. By varying the length of the air column in the instrument (by opening and closing valves on the instrument), tones of different frequencies are produced.

Many factors have an impact on the musical tone that is produced. The design of the instrument mouthpiece itself can have profound effects. For example, the design and depth of the tone chamber and the type of reed employed can alter the tone. In addition, the tuning or repair of the instrument can be a factor. These and other affects are equipment related. Parameters relating to the artist's technique include air speed or air pressure (known in the field as air support) and embouchure, both of which are factors that affect the musical tone. Embouchure is the physical placement of the artist's mouth on the instrument and includes the development of a pressure chamber to blow air into or over the mouthpiece. Air pressure in the mouth cavity and air velocity in a stream of air blown from the mouth are directly related mathematically (Bernoulli equation). Teachers of woodwind instruments are generally agreed that the foundational parameter for proper technique in these instruments is air support (pressure) for reeds, or air speed for flutes and piccolo.

The role of the embouchure is to provide an efficient pressure chamber by which to direct air into the mouthpiece and to allow the reed to vibrate freely or provide the correct flow (speed) of air over the open hole (flute and piccolo). A correct air support will strengthen the embouchure, while a weak one will damage it. In short, without proper air support, the student cannot produce a tone even with a good embouchure. If the musician does not produce the proper air support, the tendency is to compensate for the improper air support by altering the embouchure. As a result, a poor musical tone will be produced. Therefore, it is essential that a musician learn how to produce the proper air support consistently as the baseline for proper musical technique development.

In order to avoid the problems that are associated with improper air support, music instructors spend a great deal of time teaching musicians how to produce the necessary air support that will produce an acceptable musical tone. However, it is quite difficult to teach a student how to produce the proper air support without some feedback on the results of his or her efforts. Unless the musician already knows how producing the correct air support relates to an acceptable musical tone, the musician will require an instructor or some other knowledgeable observer in order to learn the correct level of air support. Furthermore proper air support varies with the instrument.

There are several training devices that are currently available that attempt to teach a musician how to produce the proper air support. However, they all suffer from disadvantages in their use. For example, U.S. Pat. No. 5,749,368 to Kase describes a breath air flow device that can be used to measure the air support applied to the device and provides a gauge readout of the air pressure downstream of the mouthpiece. A standard mouthpiece can be connected to the device, and the resistance of the device to the air that is flowed through the mouthpiece can be changed by opening and closing an aperture in the device in order to simulate the "feel" of different musical instruments. However, the device described by Kase suffers from the disadvantage that no sound is produced. While a musician may be able to correlate the feel of producing air support that produces a certain pressure reading, the musician will not be able to associate how producing that level of air support feels with how an acceptable musical tone sounds. In addition, since the musician is not using his/her own instrument, the musician must manipulate the aperture to make the device simulate the feel of his/her own instrument. Obviously, if the aperture setting is not correct, the device will not be even minimally effective as the musician will be training to produce an incorrect air support.

Therefore, what is needed is a training device that will measure the air support applied to a musical instrument and provide a signal to the musician when the air support is sufficient to produce an acceptable musical tone. This feedback signal must be generated while the musician is playing the instrument in a normal fashion, i.e., without any interference from the measurement device. In this manner, the musician will be able to correlate the feel of producing an air support sufficient to produce an acceptable musical tone with the sound of that tone. In addition, since the needed device allows a musician to use his/her own instrument, the issue of training to produce an air support that may be correct for a training device, but not appropriate for the musician's instrument is made mute. The present disclosure describes such a device.

SUMMARY

The present disclosure describes a musical training device that can measure the air support applied to a musical instrument and alert the musician when he or she is providing sufficient air support to produce an acceptable musical tone. In addition, the device can be incorporated into a musical instrument without altering the manner and style in which the musical instrument is played. Therefore, the musician can correlate the feel of producing an air support sufficient to produce an acceptable musical tone with the sound of the musical tone. There are no special adjustments to be made by the musician to the device to attain the benefits described as was required by many of the devices of the prior art.

The present disclosure describes a musical training device comprising a modified mouthpiece and a pressure sensor operationally coupled to the mouthpiece. The mouthpiece is of conventional design for a given type of musical instrument and comprises a directing means, such as an air passage within the mouthpiece, to direct at least a portion of the air support applied to the instrument to the pressure sensor. The pressure sensor comprises a measuring means, an indicating means and a housing to contain at least a portion of the above components. The measuring means comprises the components required to measure the air support applied to the instrument by a musician and to determine when the air support applied to the musical instrument is sufficient to produce an acceptable musical tone. The indicating means is functionally coupled to the measuring means and comprises the components necessary to alert the musician when the measuring means determines the air support applied to the instrument is sufficient to produce an acceptable musical tone. The housing comprises the components required to functionally arrange the components of the pressure sensor. In one embodiment, the measuring means comprises a flexible diaphragm in communication with a spring switch and a power source, the power source separated from the spring switch by a distance. The indicating means may comprise a light emitting diode, an incandescent light bulb or similar element that is capable of alternating between a first state and a second state. In the description that follows, the first state will alert the musician that the air support applied to the instrument is sufficient to produce an acceptable musical tone, while the second state will alert the musician that the air support applied to the instrument is not sufficient to produce an acceptable musical tone. It is preferred that the first state be characterized by a light emitting from the indicating means and the second state be characterized by an absence of light emitting from the indicating means.

In operation, the indicating means is functionally coupled to the measuring means in such a manner that when the air support applied to the instrument reaches a predetermined level sufficient to produce an acceptable musical tone, the measuring means causes an electrical circuit to close and current to flow through the indicating means, which causes the indicating means to switch to the first state. In the embodiment described above, when the air support is sufficient to produce an acceptable musical tone, the diaphragm flexes upward, an amount sufficient to bring the spring switch into contact with the power source. As a result, current flows from the battery into the indicating means, causes the indicating means to switch to the first state.

The first state of the indicating means alerts the musician that the air support being applied to the instrument is sufficient to produce an acceptable musical tone. The indicating means may be visible to the musician only, to an observing party only (such as a music instructor) or to both the musician and an observing party. It is preferred that at least the musician be able to view the indicating means at all times. Since the musician is provided with immediate feedback regarding the proper air support needed to produce an acceptable musical tone, the musician can learn and train to associate the correct air pressure with an acceptable musical tone.

The detailed description, in conjunction with the figures provided, will discuss various embodiments of the musical training device and its method of operation. The musical training device of the present disclosure can be adapted to fit any woodwind musical instrument, including, but not limited to, the saxophone, clarinet, piccolo and flute. For the instruments that are played by blowing a stream of air over a resonance opening (flute and piccolo), a pitot tube may be used to measure the air velocity. The pitot tube is a gas dynamic device that converts air velocity to air pressure (commonly used on airplanes). It is positioned on the mouthpiece at a location such that at least a portion of the air stream from the player's mouth impacts the tube and is converted to pressure. Hence for all the woodwind instruments, air support produced by the musician is the quantity measured by the musical training device herein disclosed. The figures described below illustrate a musical training device intended for use with a clarinet, but this illustration is way of example only and should not limit the scope of the present disclosure.

DETAILED DESCRIPTION

In the specification and claims that follow, the following terms should be given the definitions set forth below: Acceptable musical tone—An acceptable tone from a musical instrument is one that sounds the fundamental frequency and the overtone characteristic to that particular instrument. This can be determined electronically, but is more commonly judged by a musician experienced with the instrument being played. Air support—The pressure generated by the musician using his/her lungs and diaphragm and applied to the musical instrument.

With reference to FIGS. 1–4 a novel musical training device employing the concepts of the instant disclosure will be described. The musical training device 10 comprises a mouthpiece 12 for use with a musical instrument and a pressure sensor 14 operationally coupled to the mouthpiece 12. The mouthpiece is of conventional design common for a given musical instrument and comprises a directing means to direct at least a portion of the air support applied to the instrument to the pressure sensor 14. The pressure sensor 14 comprises a measuring means, an indicating means and a housing 16, the measuring means and the indicating means being at least partially enclosed in the housing 16. The measuring means comprises the components required to measure the air support applied to an instrument by a musician and to determine when the measuring means determines the air support applied to the instrument is sufficient to produce an acceptable musical tone. The indicating means is functionally coupled to the measuring means and alerts the musician when the air support applied to the instrument is sufficient to produce an acceptable musical tone. The musician may be alerted either though a visual signal, an audio signal or any other signal method made responsive to the measuring means, however, a visual signal is preferred.

In the embodiment illustrated, the measuring means comprises a flexible diaphragm 100 in communication with a spring switch 102 and a power source 104. The spring switch 102 is separated from the power source 104 by a distance, the distance preferably being adjustable. The indicating means may comprise a light emitting diode, an incandescent light bulb or similar element that is capable of alternating between a first state and a second state. As stated above, the first state will alert the musician that the air support applied to the instrument is sufficient to produce an acceptable musical tone, while the second state will alert the musician that the air support applied to the instrument is not sufficient to produce an acceptable musical tone. It is preferred that the first state be characterized by a light emitting from the indicating means and the second state be characterized by an absence of light emitting from the indicating means.

In operation, the indicating means is functionally coupled to the measuring means in such a manner that when the air support applied to the instrument reaches a predetermined level sufficient to produce an acceptable musical tone, the measuring means causes an electrical circuit to close and current to flow through the indicating means, which in turn causes the signaling means to switch to the first state. In the embodiment described above and illustrated below, when the air support reaches the predetermined level, the diaphragm 100 flexes upward a sufficient amount so that the spring switch 102 traverses the distance and contacts the power source 104 such that current flows from the battery into the indicating means causing the indicating means to switch to a first state.

Figure 1:
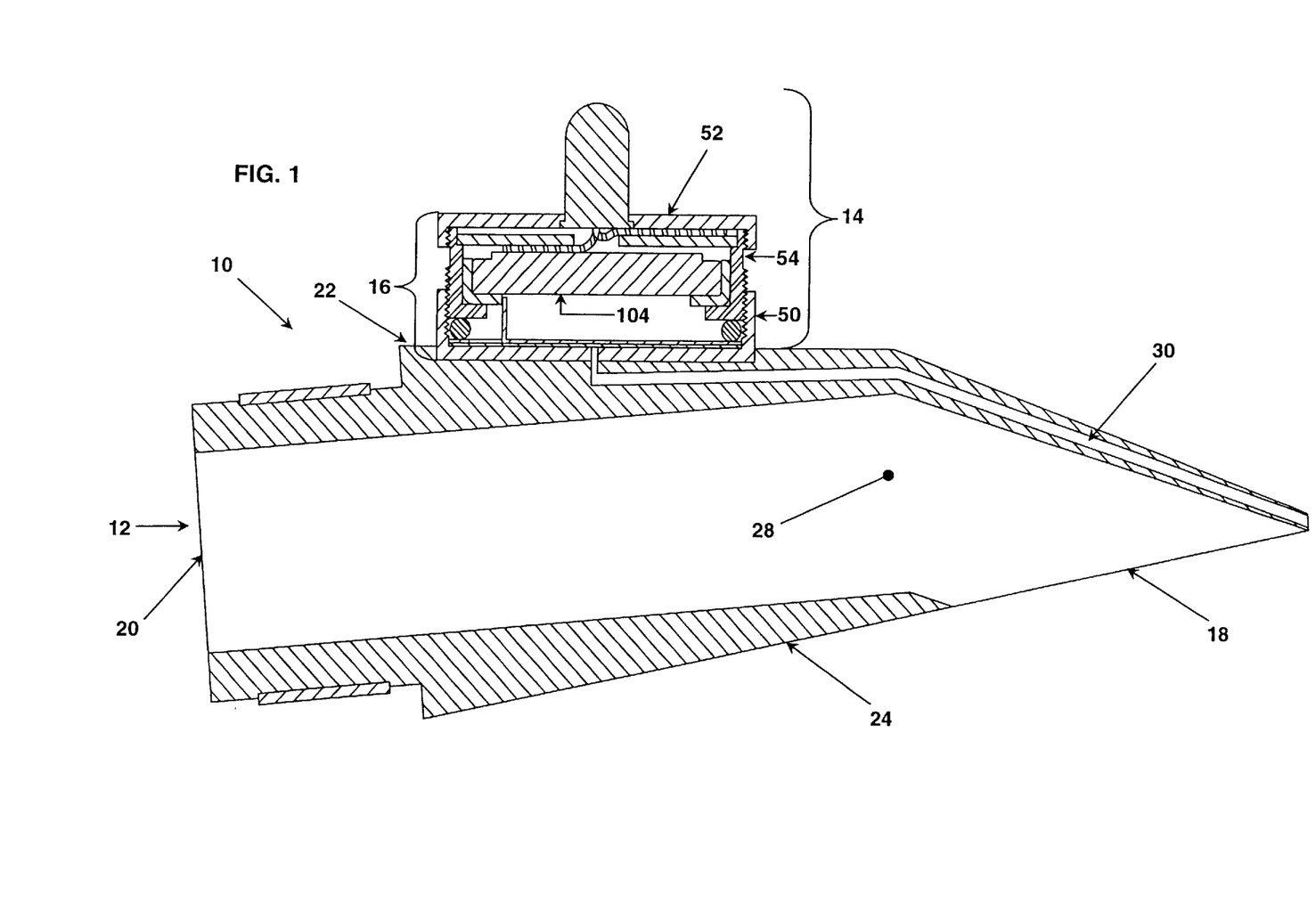
FIG. 1 is a cross sectional side view of one embodiment of the musical training device of the present disclosure.
Figure 2:
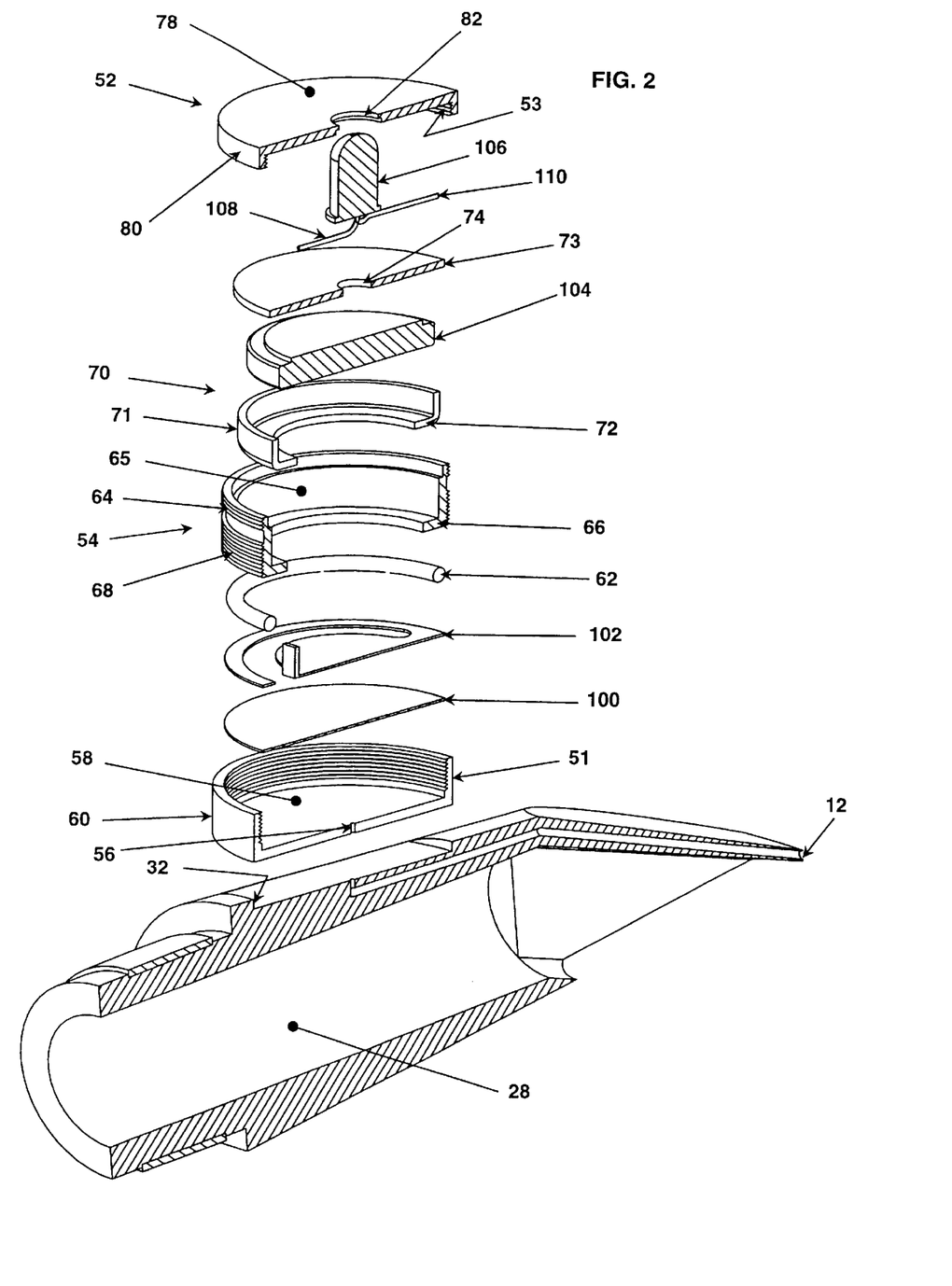
FIG. 2 is an exploded cross sectional side view of one embodiment of the musical training device of the present disclosure.

With reference to FIGS. 1 and 2, the mouthpiece 12 comprises a tip opening 18 and a generally cylindrical opening 20 opposite the tip opening 18 for joining the mouthpiece 12 to a musical instrument (not shown). Upper side 22 and lower side 24 extend from the tip opening 18 to the second opening 20 and are joined by an outer wall. The upper side 22, lower side 24 and outer wall define the mouthpiece, and further define an interior tone chamber 28. The mouthpiece 12 further comprises a directing means. The function of the directing means is to direct at least a portion of the air support applied to the instrument to the sensor 14 such that the air support is in communication with the measuring means. In FIGS. 1 and 2 the directing means comprises an internal channel 30 extending from the tip opening 18 to the upper side 22, specifically to inlet channel 56 on receiving notch 32, such that the air support is in communication with the measuring means. Other configurations of the directing means are possible, such as an external tube or hose that delivers at least a portion of the air support to the measuring means as described above. For certain musical instruments, such as the flute and piccolo, a pitot tube is used to divert a portion of the stream of air blown across the resonance opening to the pressure sensor 14. Therefore, the pitot tube is also considered to be an alternate embodiment of the directing means and should be considered within the scope of the disclosure.

Figure 3:
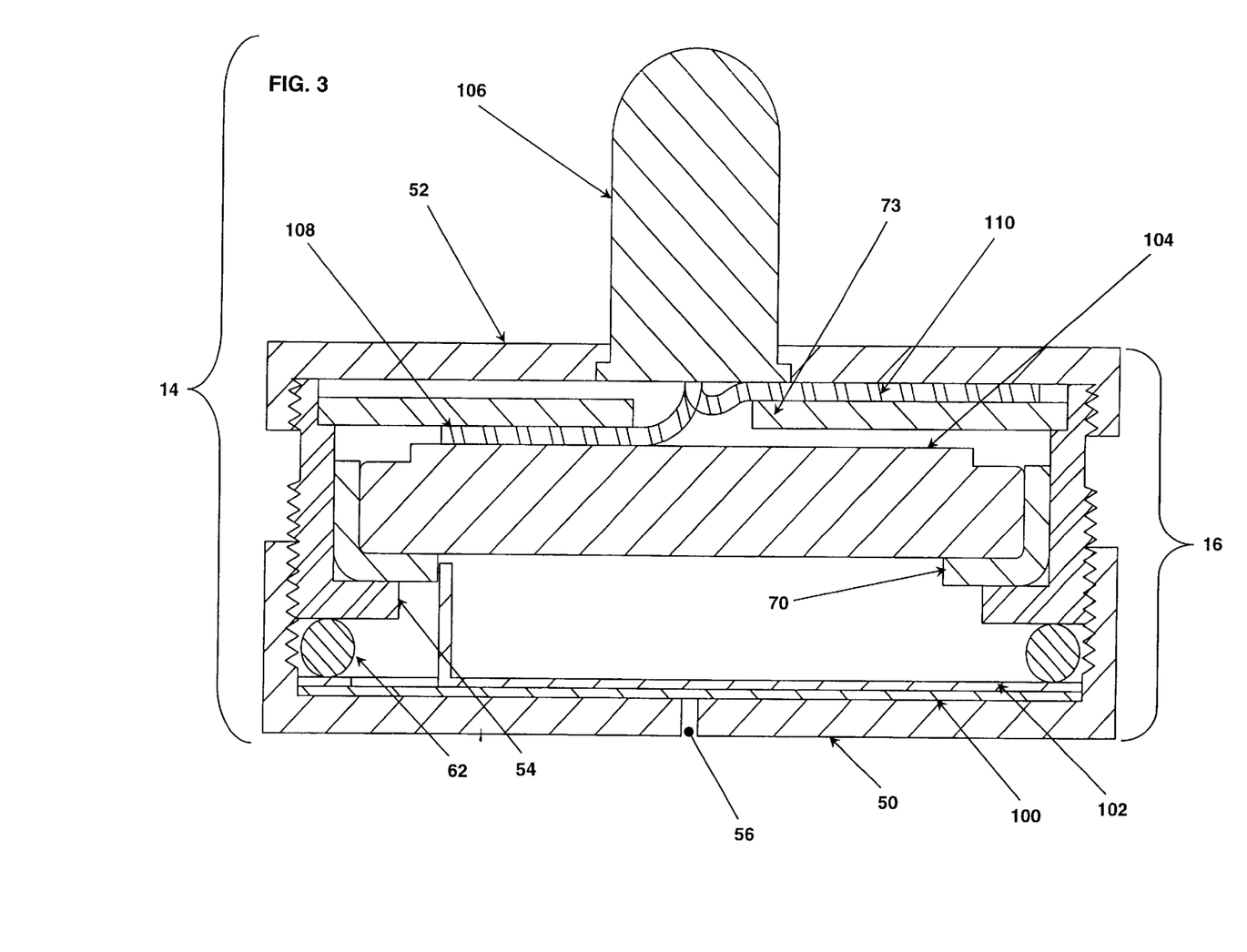
FIG. 3 is a cross sectional side view illustrating one embodiment of the arrangement of the pressure sensor in the housing.
Figure 4:
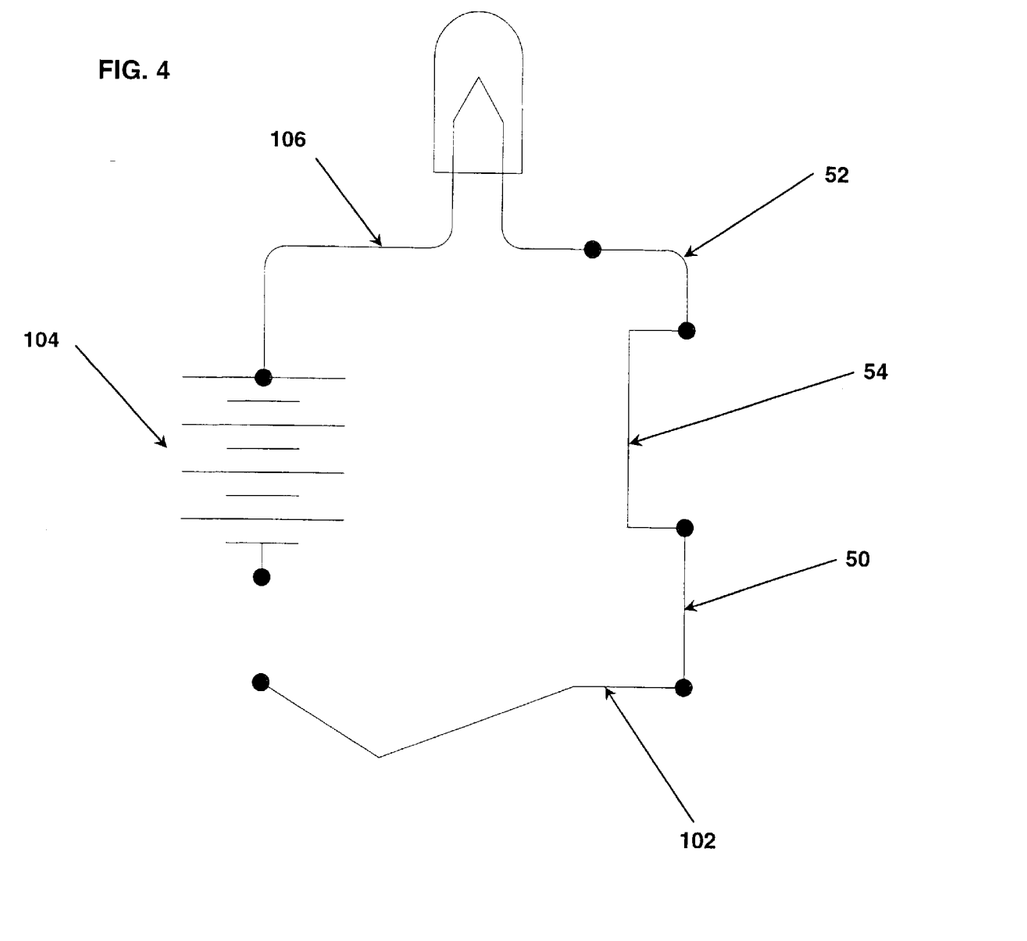
FIG. 4 is a circuit diagram illustrating one embodiment of the electrical circuit.

The housing 16 functionally arranges and protects at least a portion of the measuring means and the indicating means and is coupled to the mouthpiece 12. Although many arrangements are possible, the applicant provides the following embodiment as illustration. Other arrangements that accomplish the functional arrangement are within the ordinary skill of one in the art and should be considered within the scope of this disclosure. With reference to FIGS. 1–3, the housing 16 comprises a mouthpiece adapter base 50, a cap 52 and an internal housing 54, the base 50 and cap 52 being adapted to adjustably receive the internal housing 54. Generally, the base 50 serves to support the measuring means, the internal housing 54 functions to hold the power source 104 and the cap 52 serves to provide a seal for the housing and to receive a portion of the indicating means.

The base 50 is functionally coupled to the mouthpiece 12 such that the air support applied to the instrument is brought into communication with the measuring means. The base 50 is coupled to the upper side 22 of mouthpiece 10. Several means to couple the base 50 to upper side 22 are possible.

FIG. 2 illustrates base 50 interacting snugly with receiving notch 32 of upper side 22 so that base 50 is retained in notch 32 via adhesive bonding. Alternatively, the base 50 may be retained in notch 32 by a pressure fit or through the use of complementary threaded sections on the base 50 and notch 32. In each of these methods to couple the pressure sensor 14 to the mouthpiece 12, the path of the air support to the measuring means must be maintained. Other means for coupling that maintain the path of the air support to the measuring means are within the ordinary skill of one in the art and should be considered within the scope of this disclosure.

The base 50 has a bottom 58 and a generally circular wall 60. The base 50 has a housing inlet channel 56 in bottom 58 in register with the directing means, in this case internal channel 30, for delivering the air support to the measuring means, which is illustrated in FIGS. 1–3 as diaphragm 100, spring switch 102 and power source 104. The spring switch 102 is separated from the power source 104 by a distance when no air support is being applied to the instrument. The diaphragm 100 rests on the bottom 58 and is in communication with the air support delivered via the internal channel 30 and inlet channel 56 and the spring switch 102. A gasket (shown in this embodiment as an O-ring) 62 separates the spring switch 102 from the internal housing 54.

The internal housing 54 comprises a generally circular outer wall 64 which defines a cavity 65, with an internal lip 66 extending around the circumference of one end of the wall 64 into cavity 65. The exterior surface of the outer wall 64 has machine threads 68 for interaction with complementary threads 51 and 53 on the interior of wall 60 of base 50 and wall 80 on cap 52, respectively. Therefore, the internal housing is removably and adjustably coupled to the base 50 and cap 52. Any means that will allow this removable coupling can be used. A power source insulator 70 fits within internal housing 54 and comprises a generally circular wall 71, with an internal lip 72 extending around the circumference of one end of the wall 71 into cavity 65. The insulator 70 and spacer 73 isolate the power source 104 from the remainder of the housing 16 and ensure the electrical circuit path necessary for the activation of the indicating means is maintained by preventing the battery from contacting any conducting components that may cause a short in the electrical circuit (discussed below). A spacer/insulator 73 with opening 74 rests on power source 104 to add further insulation. The opening 74 in the spacer 73 allows components of the indicating means to be in communication with the power source 104. In the embodiment illustrated, the indicating means is shown comprising a light emitting diode (LED) 106, with a positive leg 108 and a negative leg 110, both functionally linked to the LED 106. The positive leg 108 extends through opening 74 to be in contact with power source 104, while the negative leg 110 rests on the spacer 70 in contact with a conductive element, illustrated as the components of the housing 16. However, the conductive element may be a section of conductive foil arranged within housing 16 or an additional section of wire. The function of the conductive element is to provide a return path for the current flow back to the power source 104 to produce a closed electrical circuit when required. The cap 52 comprises a top side 78 and a generally circular outer wall 80 surrounding the top side 78. The top side 78 has an opening 82 to receive at least a portion of the indicating means, in this embodiment the LED 106.

The pressure sensor 14 functions to provide a signal to the musician when the air support reaches a predetermined level sufficient to produce an acceptable musical tone as determined by the measuring means. In operation of the embodiment illustrated, the diaphragm 100 is in communication with spring switch 102 and is situated on bottom 58 of base 50 such that the diaphragm is in communication with the air support delivered by the internal channel 30 (directing means) and inlet channel 56. As a result of this placement, the diaphragm 100 is responsive to the air support applied to the instrument, causing the diaphragm to flex upwards (away from bottom 58) and bear against spring switch 102 when air support is applied to the instrument. With increasing air support, the diaphragm 100 and spring switch 102 flex upward toward the power source 104 in proportion to the pressure level. With sufficient upward flexing (pressure), the spring switch 102 traverses the distance separating spring switch 102 and power source 104, and is brought into contact with the power source 104. In this manner the measuring means creates a closed electrical circuit and current flows from the power source 104 into LED 106 through positive leg 108, and out of the LED 106 through negative leg 110, causing the LED 106 to switch to the first state. The current then completes the electrical circuit back to the power source 104 through the conductive element (illustrated here as components of the housing 16). The circuit path described above is illustrated in FIG. 4. However, as discussed above the conductive element may be a separate return wire or an internal conducting element (such as a conductive foil) situated as appropriate within housing 16. In addition to LED 106, other indicating means, such as incandescent lights may also be used. The electrical circuit may further comprise an in line resistor to modulate the current supplied to the LED 106 or other indicating means. As the air pressure decreases, the diaphragm 100 and spring switch 102 no longer flex upward a sufficient amount to bring spring switch 102 into contact with power source 104, and the electrical circuit is opened and no current flows through the indicating means, switching the LED 106 from the first state to the second state.

The distance the spring switch 102 must travel to contact the power source 104 is adjustable by moving the internal housing 54 relative to the base 50, which can be done by virtue of their threaded connections as illustrated in FIG. 2. Internal housing 54 compresses O ring 62 to facilitate adjustment of the distance spring switch 102 must flex to contact power source 104. The adjustment is made to cause the measuring means to close the electrical circuit at a level of air support determined to be that level of air support which is sufficient to produce an acceptable musical tone for a given instrument. As the air support to produce an acceptable musical tone can vary depending upon the instrument, it is important that the measuring means can be adjusted so that the indicating means is switched to the first state at the appropriate level of air support. If the distance is increased, the diaphragm will have to detect increased air support to bring spring switch 102 into contact with the power source 104, requiring a greater air support before the indicating means is switched to the first state. Alternatively, the type of diaphragm may be altered so that the types of diaphragms used flex upward a different amount in response to a given level of air support. In a preferred embodiment, the pressure sensor 14 is adjusted so that the indicating means is switched to the first state at a pressure level of 15 to 18 inches of water. However, as discussed above, this pressure level can be adjusted either up or down by varying the distance between the spring switch 102 and the power source 104, or by varying the diaphragm 100 used in the pressure sensor 14.

The pressure sensor 14 may be modified so that the indicating means is visible to the musician only, to an observer only, or to both the musician and an observer. Such an arrangement can be helpful in various situations. For example, the observer may be a music instructor who may prefer that the indicating means be visible only to him/her and not to the musician in teaching situations. However, when the observer/instructor is not present, it is advantageous that the indicating means be visible to the student for training purposes. The modification may be as simple as a removable cap (not shown) that blocks out one half of the indicating means. When desired the cap may be placed on the indicating means to block the indicating means from being viewed by the musician or the observer and be removed so that both the musician and the observer can view the indicating means.

As discussed above, the pressure sensor 14 may be removable from the mouthpiece 12. This is advantageous when the sensor 14 needs repair or adjustment or battery replacement. In the present embodiment, base 50 is adhesively bonded to the mouthpiece 12, but the components of the sensor 14 can be removed for replacement of the power source 104. All other parts of the pressure sensor 14 may be removed by unscrewing the internal housing 54 and indicator cap 52.

The components of the pressure sensor 14 and the sensor housing 16 may be constructed from a variety of materials. The choice of materials can be made based on durability, costs and aesthetic considerations. In the present embodiment, the housing 16 is used to complete the electrical circuit used to provide current to the signaling means as discussed above and illustrated in FIGS. 1–4. When the housing 16 is used in this manner, it is preferred that the base 50, cap 52 and internal housing 54 be manufactured from conductive materials such as aluminum or brass. If conductive materials are not used, a wire may be used to complete the electrical circuit, or the interior parts of the housing 16 may be lined with a conductive foil as appropriate.

The diaphragm 100 must be constructed of a flexible membrane. In the present embodiment, the diaphragm 100 is made of thin latex rubber, but other rubbers may be used. The spring switch 102 must exhibit elastic characteristics and be conductive. In the present embodiment, the spring switch 102 is constructed of phosphor bronze, but other conductive materials may be used. The power source 104, LED indicator 106 and O ring 62 are commercially available and several varieties and sizes may be used. Battery size and LED characteristics together determine battery life. The battery insulator 70 and spacer/insulator 73 may be made of a variety of non-conducting materials. The mouthpiece 12 may be constructed from any material, but a variety of hard plastics are in more common use in musical instruments.

I claim:

1. A musical training device for use with a musical instrument, the device comprising:

a a modified mouthpiece of conventional design comprising a directing means to direct at least a portion of an air support applied to the instrument to a pressure sensor; and b a pressure sensor comprising:

i a measuring means in communication with the directing means to determine when the air support generated by the creation of a proper embouchure and applied to the instrument is sufficient to produce an acceptable musical tone;

ii an indicating means functionally linked to the measuring means, the indicating means capable of switching between a first state and a second state; and iii a housing containing at least a portion of the measuring means and the indicating means, the housing functionally coupled to the mouthpiece such that the measuring means is in communication with the directing means.

2. The device of claim 1 where the components of the pressure sensor arranged such that the measuring means creates a closed electrical circuit when the measuring means determines the air support applied to instrument is sufficient to produce an acceptable musical tone, and such that the closed circuit causing the indicating means to switch to t he first state, and the measuring means creates an open electrical circuit when the measuring means determines that the air support applied to instrument is not sufficient to produce an acceptable musical tone, the open circuit causing the indicating means to switch to the second state.

3. The device of claim 2 where the first state is characterized by the indicating means producing a visual signal and the second state is characterized by the indicating means ceasing to produce a visual signal.

4. The device of claim 3 where the indicating means is selected from the group consisting of a light emitting diode and an incandescent light.

5. The device of claim 4 where the indicating means is fashioned such that the indicating means can be viewed by individuals selected from the group consisting of a musician and an observer, a musician, and an observer.

6. The device of claim 2 where the measuring means is adjustable such that the measuring means creates the closed electrical circuit at a level of air support selected by a musician.

7. The device of claim 2 where the measuring means creates the closed electrical circuit is created when the measuring means determines the air support applied to instrument is in the range of about 15 to 18 inches of water.

8. The device of claim 2 where the measuring means further comprises a flexible diaphragm, a spring switch and a power source.

9. The device of claim 1 where the directing means is selected from the group consisting of an internal channel in the mouthpiece, an external channel connected to the mouthpiece and a pitot tube coupled to the mouthpiece.

10. A musical training device for use with a musical instrument, the device comprising:
 a. a modified mouthpiece of conventional design comprising a directing means to direct at least a portion of the air support applied to the instrument to a pressure sensor, and
 b. a pressure sensor comprising:
  i. a measuring means sensor in communication with the directing means to determine when the air support generated by the creation of a proper embouchure and applied to the instrument is sufficient to produce an acceptable musical tone;
  ii. an indicating means functionally linked to the measuring means, the indicating means capable of switching between a first state and a second state; and
 c. a housing containing at least a portion of the measuring means and the indicating means, the housing functionally coupled to the mouthpiece such that the measuring means is in communication with the directing means, the housing further comprising an adapter base, an internal housing and a cap, the internal housing being adjustably secured in the adapter base.

11. The device of claim 10 where the components of the pressure sensor arranged such that the measuring means creates a closed electrical circuit when the measuring means determines the air support applied to instrument is sufficient to produce an acceptable musical tone, and such that the closed circuit causing the indicating means to switch to the first state, and the measuring means creates an open electrical circuit when the measuring means determines that the air support applied to instrument is not sufficient to produce an acceptable musical tone, the open circuit causing the indicating means to switch to the second state.

12. The device of claim 11 where the first state is characterized by the indicating means producing a visual signal and the second state is characterized by the indicating means ceasing to produce a visual signal.

13. The device of claim 12 where the indicating means is selected from the group consisting of a light emitting diode and an incandescent light.

14. The device of claim 13 where the indicating means is fashioned such that the indicating means can be viewed by individuals selected from the group consisting of: a musician and an observer, a musician, and an observer.

15. The device of claim 10 where the measuring means further comprises a flexible diaphragm, a spring switch and a power source, the spring switch separated from the power source by a distance, and the indicating means is a light emitting diode with a positive leg and a negative leg.

16. The device of claim 15 where the diaphragm is positioned on the adapter base in communication with the directing means, the spring switch is in communication with the diaphragm, the power source is secured in the internal housing and insulated from the remainder of the housing by a power source insulator and a spacer, the positive leg of the light emitting diode is in communication with the power source and the negative leg of the light emitting diode is in communication with a conductive element, such that a closed electrical circuit is formed when the spring switch contacts the power source.

17. The device of claim 16 where the closed electrical circuit is formed when the diaphragm flexes upward in response to the air support delivered to the diaphragm an amount sufficient move the spring contact an amount at least equal to the distance such that the spring switch contacts the power source.

18. The device of claim 17 where the distance is adjustable such that the closed electrical circuit is created at a level of air support selected by a musician.

19. The device of claim 18 where the distance is adjusted by adjusting the internal housing in the adapter base.

20. The device of claim 17 where the measuring means creates the closed electrical circuit is created when the air support applied to instrument is in the range of about 15 to 18 inches of water.

21. The device of claim 10 where the directing means is selected from the group consisting of an internal channel in the mouthpiece, an external channel connected to the mouthpiece and a pitot tube coupled to the mouthpiece.

22. A pressure sensor for use with a musical instrument, the pressure sensor comprising:
 a. a measuring means to determine when the air support generated by the creation of a proper embouchure and applied to the instrument is sufficient to produce an acceptable musical tone;
 b. an indicating means functionally linked to the measuring means, the indicating means capable of switching between a first state and a second state; and
 c. a housing containing at least a portion of the measuring means and the indicating means, the housing further comprising an adapter base, an internal housing and a cap, the internal housing being adjustably secured in the adapter base.

23. The device of claim 22 where the components of the pressure sensor arranged such that the measuring means creates a closed electrical circuit when the measuring means determines the air support applied to instrument is sufficient to produce an acceptable musical tone, and such that the closed circuit causing the indicating means to switch to the first state, and the measuring means creates an open electrical circuit when the measuring means determines that the air support applied to instrument is not sufficient to produce an acceptable musical tone, the open circuit causing the indicating means to switch to the second state.

24. The sensor of claim 23 where the first state is characterized by the indicating means producing a visual signal and the second state is characterized by the indicating means ceasing to produce a visual signal.

25. The sensor of claim 24 where the indicating means is selected from the group consisting of a light emitting diode and an incandescent light.

26. The sensor of claim 25 where the indicating means is fashioned such that the indicating means can be viewed by individuals selected from the group consisting of a musician and an observer, a musician, and an observer.

27. The sensor of claim 23 where the measuring means is adjustable such that the measuring means creates the closed electrical circuit at a level of air support selected by a musician.

28. The sensor of claim 23 where the measuring means creates the closed electrical circuit when the measuring means determines the air support applied to instrument is in the range of about 15 to 18 inches of water.

29. The sensor of claim 22 where the measuring means further comprises a flexible diaphragm, a spring switch and a power source, the spring switch separated from the power source by a distance, and the indicating means is a light emitting diode with a positive leg and a negative leg.

30. The sensor of claim 29 where the diaphragm is positioned on the adapter base in communication with the directing means, the spring switch is in communication with the diaphragm, the power source is secured in the internal housing and insulated from the remainder of the housing by a power source insulator and a spacer, the positive leg of the light emitting diode is in communication with the power source and the negative leg of the light emitting diode is in communication with a conductive element, such that a closed electrical circuit is formed when the spring switch contacts the power source.

31. The sensor of claim 29 where the distance is adjustable such that the closed electrical circuit is created at a level of air support selected by a musician.

32. The sensor of claim 29 where the distance is adjusted by adjusting the internal housing in the adapter base.

33. The device of claim 1 where the musical instrument is selected from the group consisting of the saxophone, clarinet, piccolo and flute.

34. The device of claim 10 where the musical instrument is selected from the group consisting of the saxophone, clarinet, piccolo and flute.

35. The sensor of claim 22 where the musical instrument is selected from the group consisting of the saxophone, clarinet, piccolo and flute.

\* \* \* \* \*